United States Patent

Semo et al.

[11] Patent Number: 5,638,471
[45] Date of Patent: Jun. 10, 1997

[54] METHOD OF PREPARING AN OPTICAL FIBER FOR COUPLING WITH A PHOTOTRANSDUCER AND AN OPTICAL SYSTEM OBTAINED THEREBY

[75] Inventors: Jack Semo, Palaiseau; Ndiata Kalonji, Boulogne-Billancourt, both of France

[73] Assignee: France Telecom, France

[21] Appl. No.: 420,853

[22] Filed: Apr. 12, 1995

[30] Foreign Application Priority Data

Apr. 13, 1994 [FR] France ................................ 94 04368

[51] Int. Cl.$^6$ .................................................. G02B 6/32
[52] U.S. Cl. .................... 385/33; 385/11; 385/31; 385/35; 385/38; 385/147
[58] Field of Search ............................ 385/31, 33, 35, 385/38, 11, 49, 93, 147

[56] References Cited

U.S. PATENT DOCUMENTS

| | | | |
|---|---|---|---|
| 3,910,677 | 10/1975 | Becker et al. | 385/33 X |
| 3,932,184 | 1/1976 | Cohen et al. | 385/33 X |
| 4,143,940 | 3/1979 | Khoe | 385/33 X |
| 4,490,020 | 12/1984 | Sakaguchi et al. | 385/33 |
| 5,011,254 | 4/1991 | Edwards et al. | 385/33 X |
| 5,037,174 | 8/1991 | Thompson | 385/33 |
| 5,216,733 | 6/1993 | Nagase et al. | 385/60 |
| 5,384,874 | 1/1995 | Hirai et al. | 385/34 |
| 5,446,816 | 8/1995 | Shiraishi et al. | 385/33 |

FOREIGN PATENT DOCUMENTS

| | | | |
|---|---|---|---|
| 0155379 | 3/1984 | European Pat. Off. | G02B 6/42 |
| 0294650 | 6/1987 | European Pat. Off. | B24B 19/22 |
| 0603042 | 12/1992 | European Pat. Off. | G02B 6/42 |
| 2681437 | 9/1991 | France | G02B 6/25 |
| 57-150810 | 9/1982 | Japan | 385/33 |
| 3-252617 | 11/1991 | Japan | 385/33 X |

OTHER PUBLICATIONS

IEEE Photonics Technology Letters, vol. 5, No. 2, Feb. 1993 New York pp. 184–186.
IEEE Photonics Technology Letters, vol. 4, No. 8, Aug. 1992, New York pp. 897–899 Pres by et al.
Patent Abstracts of Japan, vol. 6, No. 255 (P-162) Dec. 14, 1982.
Patent Abstracts of Japan, vol. 7, No. 282 (P-243) Dec. 16, 1983.

*Primary Examiner*—Brian Healy
*Attorney, Agent, or Firm*—Blakely Sokoloff Taylor & Zafman

[57] ABSTRACT

The present invention relates to a method of putting a lens on an optical fiber, the method comprising the steps of depositing a lens of elliptical section and in the form of a hyperboloid of revolution on the cleaved end of a polarization-maintaining fiber.

19 Claims, 4 Drawing Sheets

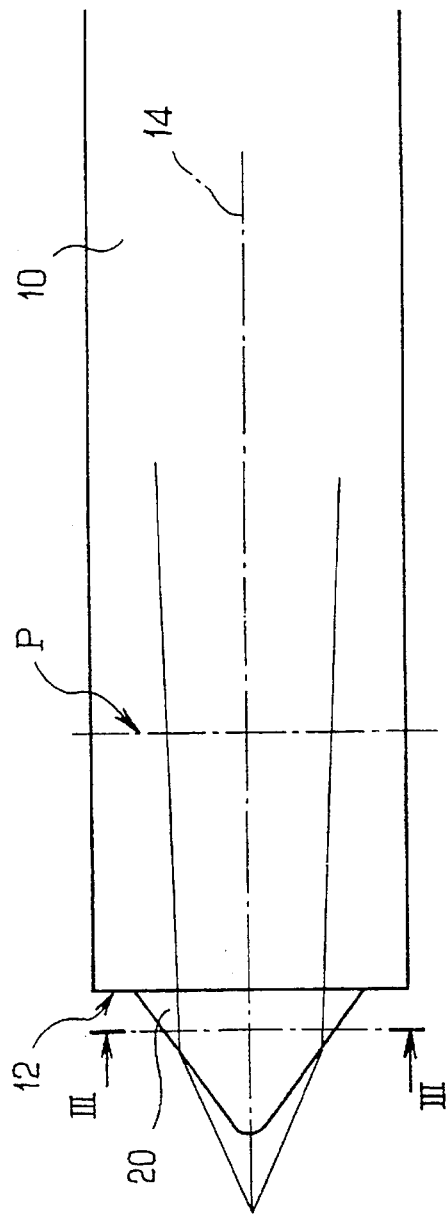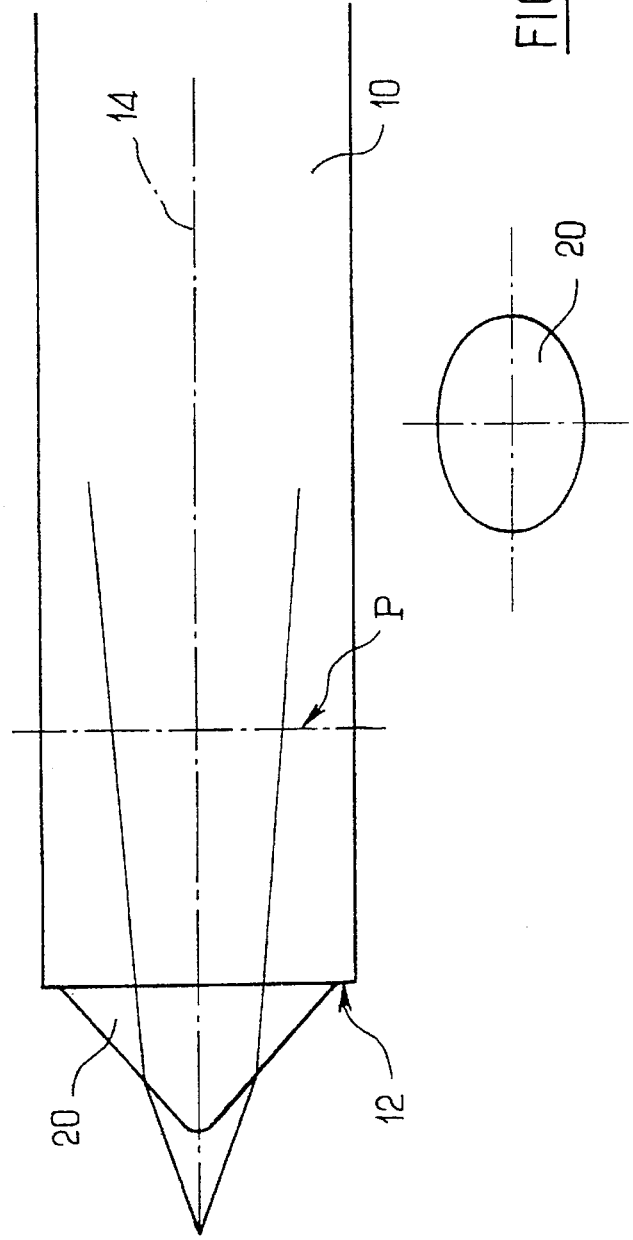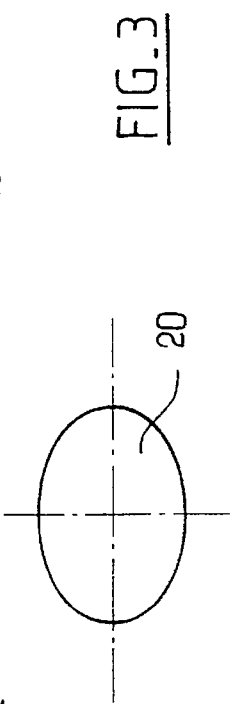

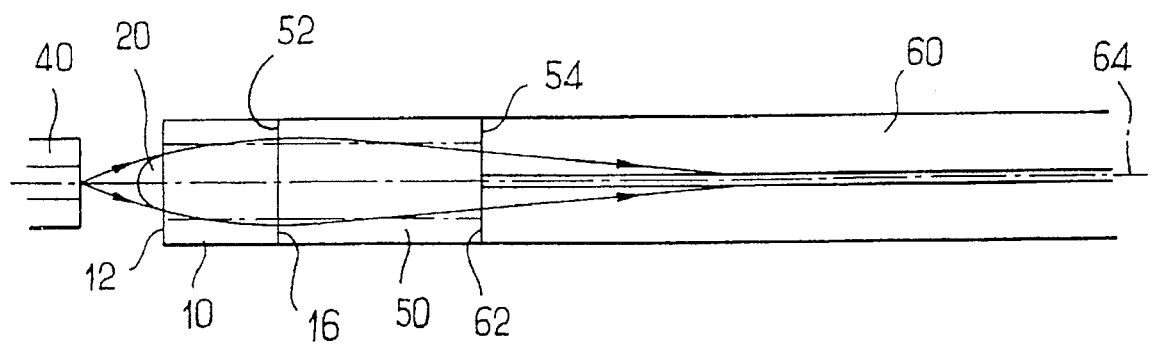
FIG_11
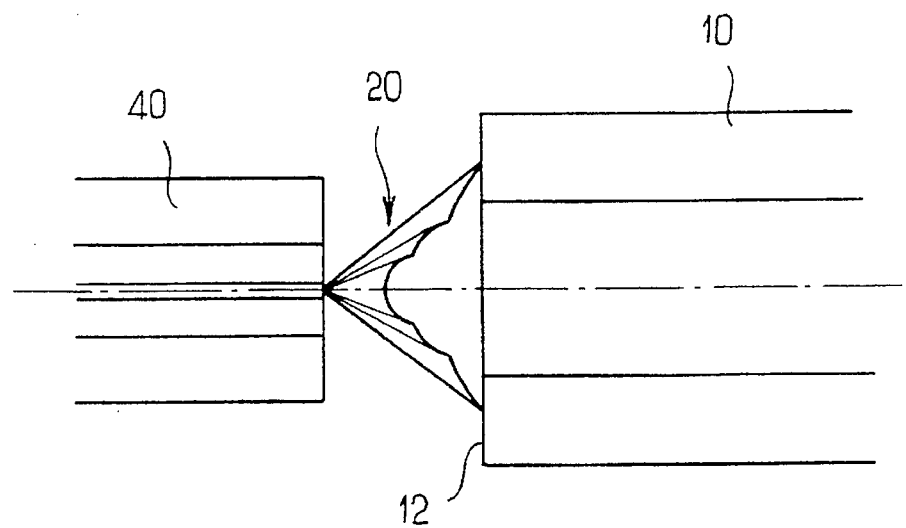
FIG_12

METHOD OF PREPARING AN OPTICAL FIBER FOR COUPLING WITH A PHOTOTRANSDUCER AND AN OPTICAL SYSTEM OBTAINED THEREBY

FIELD OF THE INVENTION

The present invention relates to the filed of optical fibers for coupling to phototransducers.

In the context of the present invention, the term "phototransducer" covers both receiver optical devices suitable for transforming an optical signal received from an optical fiber into an electrical signal, and emitter optical devices suitable for emitting an optical signal towards an optical fiber. Such receiver and/or emitter optical devices may be formed by optical integrated circuits.

More precisely, the present invention relates to an optical system including improved coupling means between an optical fiber and a phototransducer, both in the phototransducer-to-fiber emission direction and in the opposite, reception direction.

The present invention is most particularly applicable to the field of telecommunications.

BACKGROUND OF THE INVENTION

Various solutions and multiple optical combinations have been tried in the past to achieve coupling between a phototransducer and an optical fiber.

Some of those solutions are analyzed in the document "Progress in monomode optical fiber interconnection devices" published in "Journal of Lightwave Technology", vol. LT-2, No. 3, pp. 217–227, June 1984.

In French patent application filed under the number 91 11493, the Applicant has itself proposed an optical system obtained by means of a method comprising the following steps:

cleaving an optical fiber;

a piece of another fiber is subjected to heating and is stretched axially until it breaks;

aligning the stretched piece of fiber on the cleaved end of the optical fiber and putting the tip of the stretched piece of fiber into mechanical contact with the core at the cleaved end of the optical fiber; and welding a portion of the tip of the stretched piece of fiber onto the core of the cleaved end of the optical fiber in order to form a lens of desired curvature.

Nevertheless, none of those solutions gives complete satisfaction when, as is often the case, the phototransducers and the optical fibers possess differing optical modes. The optical modes of phototransducers are generally small and elliptical, typically 3×0.5 $\mu m^2$, whereas the modes of optical fibers are generally circular and larger, typically having a diameter of 8 $\mu m$ to 11 $\mu m$.

One of the key points of coupling remains matching modes between optical fibers and phototransducers.

In an attempt to improve such coupling, certain elliptical lensing techniques have been proposed.

For example, proposals have been made in the article by H. M. Presby and C. R, Giles entitled "Asymmetric fiber microlenses for efficient coupling to elliptical laser beams", published in IEEE Photonics Technology Letters, Vol. 5, No. 2, February 1993, to use a $CO_2$ laser to mechanically machine the end of the fiber to be coupled.

Proposals have also been made in the article by W. Hunziker, E. Bolz, and H. Melchior entitled "Elliptically lensed polarization maintaining fibers", published in Electronics Letters, Aug. 13, 1992, Vol. 28, No. 17, to chemically etch a polarization-maintaining fiber, and then polish the core thus put into relief by melting.

The techniques proposed in those two documents do not give complete satisfaction either. The processes of mechanical machining and of chemical etching are quite difficult to perform.

OBJECT AND SUMMARY OF THE INVENTION

The present invention now has the object of improving previously known techniques so as to improve coupling between optical fibers possessing a circular mode and phototransducers possessing a mode that is of the elliptical kind.

In the context of the present invention, this object is achieved by a method that comprises steps which consists in depositing a lens of elliptical section and in the form of a hyperboloid revolution on the cleaved end of a polarization-maintaining fiber.

In a preferred implementation, the above-specified steps of depositing the lens of elliptical section and in the form of a hyperboloid of revolution consist in:

cleaving a polarization-maintaining optical fiber;

stretching a piece of another fiber axially to rupture, while applying heat thereto;

alining the stretched piece of fiber on the cleaved end of the polarization-maintaining optical fiber and mechanically putting the tip of the stretched piece of fiber into contact with the core of the cleaved end of the polarization-maintaining optical fiber; and welding a portion of the tip of the stretched piece of fiber onto the core of the cleaved end of the polarization-maintaining optical fiber to form a lens of desired curvature.

In a further advantageous characteristic of the present invention, the piece of polarization-maintaining optical fiber lensed in this way is itself fixed on a piece of optical fiber of a different kind, e.g. a monomode optical fiber or on a graded index multimode optical fiber.

The present invention also relates to optical systems obtained by implementing the above method.

BRIEF DESCRIPTION OF THE DRAWINGS

Other characteristics, objects, and advantages of the present invention appear on reading the following detailed description with reference to the accompanying drawings given as non-limiting examples, and in which:

FIGS. 1 and 2 are two mutually orthogonal longitudinal axial section views of a piece of polarization-maintaining fiber provided with an elliptical section lens in accordance with the present invention;

FIG. 3 is a cross-section view through said lens on a section plane referenced III—III in FIG. 1;

FIG. 11 is a diagrammatic longitudinal axial section through a system in accordance with the present invention; and FIG. 12 is a diagram showing a variant embodiment of the present invention comprising a set of microlenses of increasing radii of curvature on a cleaved surface of a polarization-maintaining optical fiber.

MORE DETAILED DESCRIPTION

Figure 4:
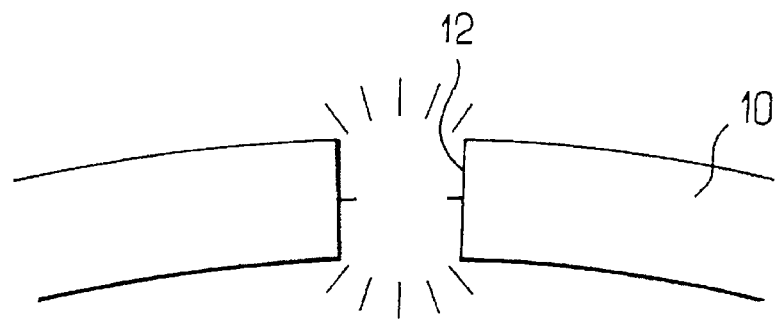
FIGS. 4 to 10 respectively show various steps in the method of fixing the elliptical section microlens on a cleaved surface of the polarization-maintaining optical fiber, in accordance with the present invention.

Accompanying FIGS. 1 and 2 show a polarization-maintaining fiber 10 having a cleaved end surface 12 that is plane and perpendicular to its longitudinal axis 14.

Accompanying FIGS. 1 and 2 also show a lens 20 that is in the form of a hyperboloid of revolution of elliptical section, that is fixed to the cleaved end 12 of the fiber 10.

Polarization-maintaining fibers are well known to the person skilled in the art. A description of such fibers, including methods of obtaining them and their properties, are to be found, for example in the article by J. Noda, K. Okamoto, and Y. Sasaki entitled "Polarization-maintaining fibers and their applications", Journal of Lightwave Technology, Vol. 17.4, No. 8, August 1986. That is why the structure of such polarization-maintaining fibers is not described below.

It is nevertheless recalled that such a polarization-maintaining fiber possesses a core of generally elliptical right section.

There now follows a description with reference to FIGS. 4 to 10 of a preferred method in accordance with the present invention enabling a microlens 20 to be deposited on the cleaved end 12 of the polarization-maintaining optical fiber 10.

The polarization-maintaining fiber 10 is initially cleaved, and can be seen in FIG. 4, to obtain an end face 12 perpendicular to its axis 14.

The step of cleaving the optical fiber 10 consists in sectioning said fiber in such a manner that its resulting end face 12 is at least substantially plane and orthogonal to its central axis.

This cleaving step can be implemented using any sectioning method known to the person skilled in the art, and, where appropriate, merely by curving the fiber 10 until it snaps from a break-inducing nick made using a very hard sharp edge, as shown schematically in FIG. 4.

Figure 5:
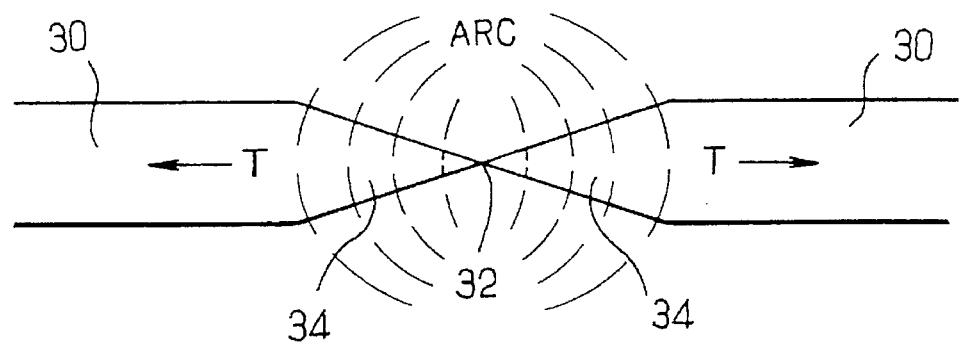

To deposit the lens 20 on the cleaved end 12 of the fiber 10, it is preferable to proceed as follows. As shown in FIG. 5, a small piece of another fiber 30 is subjected to the action of an electric arc and is stretched (traction T) axially and symmetrically until it breaks at a point 32.

The stretched fiber 30 advantageously possesses a melting temperature equal to or close to the melting temperature of the zone of the fiber that is to receive a lens. By way of example, the stretched fiber may be a graded index multimode fiber or it may be a monomode fiber even though monomode fibers have a higher melting temperature.

The piece of fiber 30 may be about 10 cm long, for example. At the end of the stretching step, two pieces of optical fiber 30 are obtained, each having a tip in the form of a conical tapering end 34.

Figure 6:
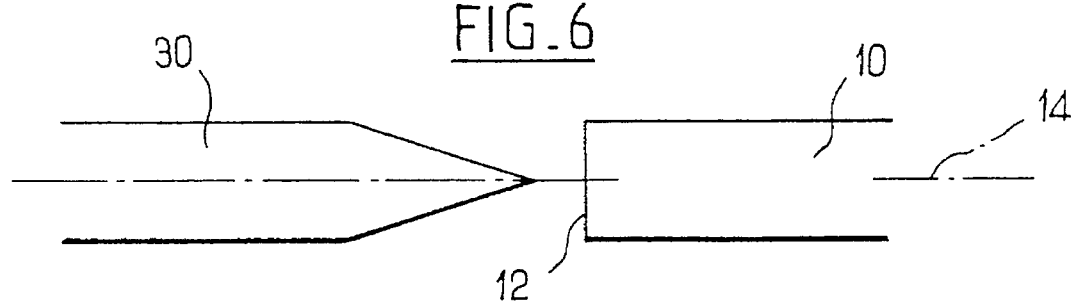

One of the stretched optical fiber pieces 30 is then placed facing the cleaved end 12 of the fiber 10 and is brought into alignment therewith, as shown in FIG. 6. This alignment can be achieved by any suitable means, e.g. by placing the cleaved fiber 10 and the piece of stretched fiber 30 in suitable V-supports. Known optical fiber splicing techniques commonly use such V-supports made of sapphire, giving accuracy of μm order. That is why such V-supports are not shown in the accompanying figures and are not described in greater detail below.

Figure 7:
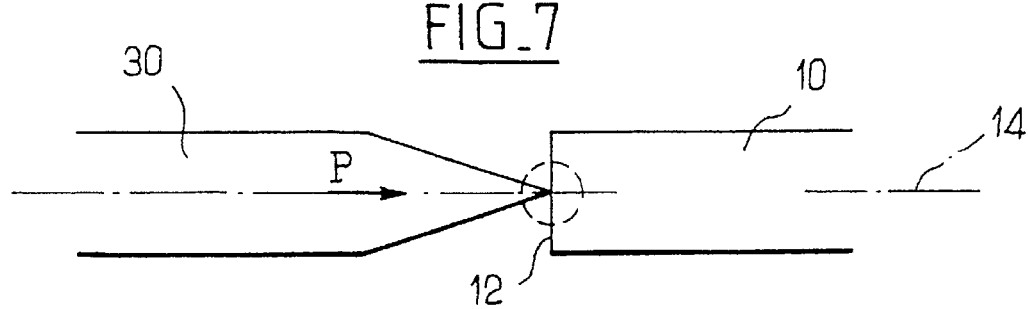

The tip of the stretched fiber 30 is then put into mechanical contact with the cleaved face 12 of the fiber 10, under a small amount of axial pressure P, as represented in FIG. 7, while maintaining the earlier alignment between the stretched fiber 30 and the cleaved fiber 10.

Figure 8:
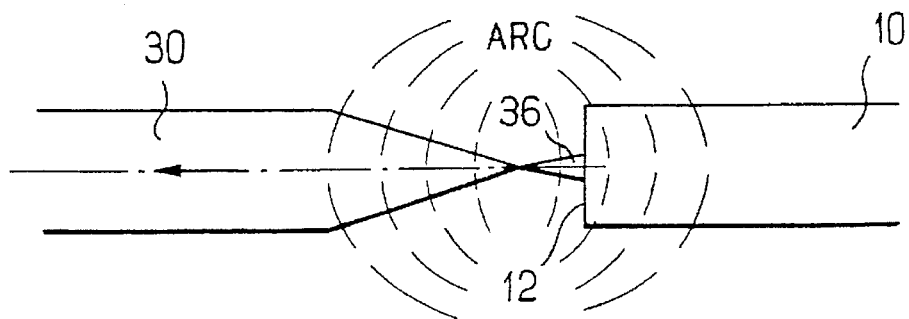
Figure 9:
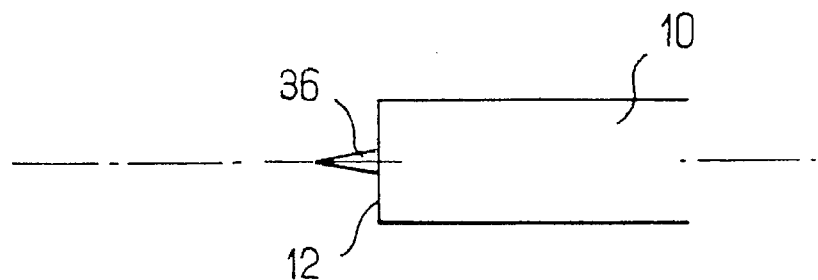

The resulting assembly is subjected to an electric arc, as shown in FIG. 8, to obtain rapid melting of low intensity at the tip of the stretched fiber 30. The fiber 30 is pulled back as soon as said tip begins to weld onto the cleaved fiber 10. This pulling back of the stretched fiber 30 serves to leave behind a glass needle 36 centered on and bonded to the core of the cleaved fiber 10, as shown in FIG. 9.

Figure 10:
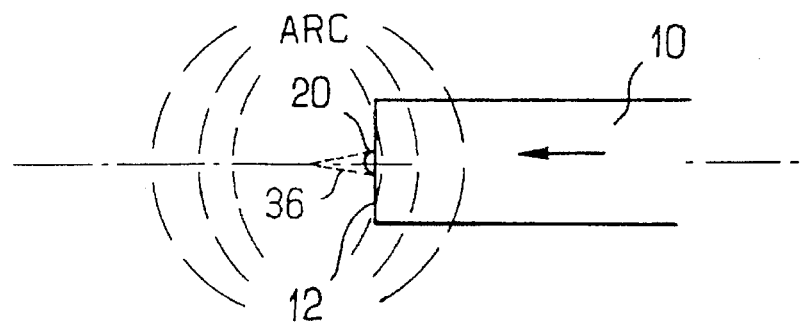

As shown in FIG. 10, it then remains to melt the glass needle 36 using one or more passes under a low intensity arc to transform the needle 36 in controlled manner into a lens 20 of elliptical section and having the desired curvatures.

All of the above-described steps can be implemented in a few minutes. A polarization-maintaining optical fiber 10 is then obtained that has a cleaved end 12 with a lens 20 welded onto said cleaved end 12.

More precisely, the pulling back of the stretched fiber 30 to form the needle 86, and the subsequent melting thereof are controlled so as to obtain a lens 20 having the profile of a hyperboloid of revolution about the axis 14 of the fiber 10, as can be seen in FIGS. 1 and 2. The controlled asphericity thus obtained is adapted to limiting aberrations and to optimizing coupling.

In addition, the method described above makes it possible to obtain a lens 20 of section that is elliptical when considered transversely to the axis 14 of the fiber 10, as can be seen in FIG. 3.

This elliptical section is obtained automatically by using the elliptical environment of the core of the polarization-maintaining fiber 10 as the base on which the lens 20 is secured while it is being manufactured.

The inventors have observed experimentally that it is very difficult to obtain a lens of elliptical section by controlled addition of glass onto the cleaved surface of a standard fiber. Surface tension forces minimize the surface area of the lens whose shape naturally tends towards that of a sphere. It is also very difficult or even impossible, without mechanical or chemical machining, to alter the circular section of a lens deposited in this way on a standard fiber.

In contrast, experience shows that having a melting temperature close to that of the core of a polarization-maintaining fiber 10, which temperature is lower than that of the cladding of said fiber, and so long as the melting temperature does not exceed that of the cladding, then the above-described method makes it possible to make a lens 20 whose base takes on and conserves an elliptical section throughout the entire duration of the method.

The lens 20 of hyperboloid profile and of elliptical section consequently makes it possible to achieve optimum coupling with the elliptical mode of phototransducers and also makes it possible to convert said elliptical mode into a circular mode.

Since the lens converges more strongly in the plane of FIG. 1 than in the plane of FIG. 2, and since the apertures of Gaussian beams coming from a phototransducer are different in these two planes, there exists a plane referenced schematically P in FIGS. 1 and 2 where the mode of the beam is circular.

For example, it suffices to place said plane P on the inlet of an associated optical fiber, as explained below, to ensure that optimum coupling is obtained between the elliptical mode of a phototransducer and the circular mode of said fiber.

Accompanying FIG. 11 shows a system of the present invention obtained in that manner.

In FIG. 11, there can be seen a phototransducer 40 placed facing the lens 20. In addition, FIG. 11 also shows a piece 50 of graded index multimode fiber interposed between the cleaved end 62 of a monomode optical fiber 60 and the piece 10 of polarization-maintaining fiber. The phototransducer 40, the lens 20, the piece of polarization-maintaining fiber 10, and the piece of graded index multimode fiber 50 are all centered on the longitudinal axis 64 of the monomode fiber 60.

More precisely, the lens 20 is placed on the cleaved surface 12 of the piece of polarization-maintaining fiber 10. The opposite end 16 of said piece of fiber 10 which is also cleaved is fixed on a cleaved end surface 52 of the piece of graded index multimode fiber 50. And finally the opposite end 54 of said piece of fiber 50 is also cleaved and is fixed to the cleaved end surface 62 of the monomode fiber 60.

The piece of graded index multimode fiber 50 is not used as a fiber but as a graded index lens.

It is known that the core diameter and gradient shape characteristics of a graded index multimode fiber element 50 determine the periodicity of propagation of a guided lightwave.

Thus, a graded index multimode fiber element 50 of calibrated length makes it possible to provide accurately matched pairs of inlet and outlet angles. In other words, starting from a given incident conical beam, the length of the graded index multimode fiber element 50 makes it possible to obtain any selected conical outlet beam.

As a result, if the starting point is an inlet beam coming from a phototransducer 40 and transiting via the microlens 20 and the piece of polarization-maintaining fiber 10 of known characteristic on the inlet of the graded index multimode fiber element 50, then there is no difficulty in selecting the appropriate length for said element 50 to obtain an outlet beam of determined aperture compatible with the characteristics of the monomode fiber 60 to be coupled.

Preferably, the length of the piece 50 of graded index multimode optical fiber is less than (n+1)×pitch+2, where (n=0, 1, 2, . . . ). The term "pitch" represents the period of the graded index multimode fiber. The value of "pitch" is determined mainly by the graded index profile.

It may be observed that the periodic aspect of beam propagation inside the piece 50 of multimode optical fiber makes it possible to increase the length of said piece of fiber 50 so as to facilitate implementation of the system.

At the outlet from the microlens 20, the aperture cone of the beam, although having a recognized angle at the apex, need not coincide with the aperture cone of the graded index multimode fiber 50. To achieve this, thereby obtaining better coupling between the incident beam and the piece of multimode fiber 50, it is possible to interpose an additional piece of step index multimode fiber of calibrated length between the piece of polarization-maintaining fiber 10 and the piece of graded index multimode optical fiber 50. The piece of step index multimode optical fiber 10 acts as a spacer of space-index material between the fiber 10 and the piece of graded index multimode optical fiber 50. The piece of step index multimode optical fiber thus serves to increase the diameter of the incident beam up to the working diameter of the graded index multimode optical fiber 50. It also provides a considerable advantage to the system by increasing the size of the gap between the phototransducer 40 and the microlens 20.

In a variant, instead of the step index, it is possible to use the piece of polarization-maintaining fiber 10 as the interposed glass element (thereby avoiding additional manipulation).

By using the above-specified components in accordance with the present invention, it is possible to adapt the divergent beam coming from a source 40 accurately to the inlet of the monomode fiber 60. The coupling is optimized by the perfect match between light propagation conditions (beam apertures) and the modes specific to the various fibers.

The improvements that stem from using the system as described above, and in particular from using a beam of very wide aperture that is non-converging at the outlet from the microlens 20, in contrast to conventional systems, are the following:

1) a reduction in coupling losses, in particular for highly divergent beams; and
2) a considerable distance to the fiber, having the following consequences:
   a) greater focal length for the inlet lens;
   b) a reduction in the feedback from the fiber on the phototransducer;
   c) an increase in the safety distance or gap in front of the phototransducer 40;
   d) greater ease in aligning the phototransducer with the fiber;
   e) better stability of the coupling; and
   f) an increase in the radius (radii) of curvature of the microlens, thereby facilitating alignment and reducing the accuracy that is normally required.

The monomode fiber 60, and the numerical aperture converter formed by the pieces of 50 and 10 plus the microlens 20 are preferably assembled together by splicing, advantageously by using fibers 60, 50, and 10 having the same outside diameter, e.g. 125 µm. Such splicing can be performed using a conventional splicing machine, such as the model sold by Beale International Technology under the reference BFS50, for example.

The fiber elements 10, 50, and 60 may be cut by means of a precision cleaver as already available on the market, e.g. the Fujikura CT-07 cleaver.

Because of the monolithic aspect of the system obtained after successive splicing starting from the monomode fiber 60, and extending all the way to making the lens 20, it is possible to obtain optimum coupling quickly with the phototransducer 40.

In yet another improvement of the present invention, provision is made in the context of the present invention not to deposit a simple lens 20 on the cleaved face of the piece of polarization-maintaining fiber 10, but to place thereon a multilens, i.e. a succession of convex lenses on the same axis, having radii of curvature that increase on approaching the fiber 10. All of the lenses 20 possess sections that are generally elliptical and together they define a profile that is generally that of a hyperboloid of revolution.

Such a set of lens 20 can be seen in accompanying FIG. 12 deposited on the cleaved face 12 of a piece of polarization-maintaining fiber 10.

To make a plurality of lenses of increasing diameter, the above-described steps shown in FIGS. 4 to 10 are repeated as many times as it is desired to deposit lenses.

In other words, the second lens, and any subsequent lens, is put into place by the following sequence of steps:
   a) a new piece of optical fiber 30 is stretched;
   b) the resulting tip 34 is aligned on the axis of the earlier lens 20, being put into contact therewith under a small amount of pressure;
   c) the tip 34 is welded onto the surface by means of an electric arc;
   d) a calibrated needle 36 is released by applying traction to the tip under the arc; and
   e) the needle 36 obtained in this way is lensed by controlled fusion.

It should be observed that during step a) for stretching a new piece of optical fiber 30, the conicity of the tip obtained by the stretching must be controlled so as to make it possible, during step d) to release a needle of appropriate size compatible with the radius of curvature desired for the new lens.

In addition, the power of the electric arc used during steps c), d), and e) must be adapted to each of those steps, otherwise the smaller masses of glass will disappear.

To perform the required fusion of the fiber 30, the inventors have made use, during testing, of a BTT type microwelder. Such a microwelder generates an electric arc.

Heating by means of an electric arc is nevertheless not essential. It could be replaced by heating using a power laser source, providing care is taken to maintain accurate alignment between the cleaved face 10 and the stretched end 34 which provides the microlens 20, and providing care is taken to produce very rapid local fusion of the tip 34 in order to weld a glass needle 36 of appropriate size onto the cleaved fiber 10.

During the steps of aligning the various components of the optical system of the present invention, in particular while alining the fibers 10, 50, and 60, and while alining the lens 20 on the cleaved face 12 of the associated piece of fiber 10, an optical signal may be injected into the non-used end of the fiber 60. The optical signal is then conveyed by the core of the fiber 60 and by passing into the facing element which is being aligned, the optical signal makes it possible to verify correct positioning of the components.

Such a step of optical verification of alignment may usefully be additional to mechanical alignment.

Naturally, the present invention is not limited to the particular embodiments described above, but extends to any variant within the spirit of the invention.

Thus, for example, the shape of the lens 20 may be refined by machining, should that be necessary, after it has been deposited on the cleaved end 12 of the polarization-maintaining fiber 10, e.g. by mechanical machining or by chemical etching.

We claim:

1. A method of putting a lens on an optical fiber, the method comprising the steps of depositing a lens of elliptical section and in the form of a hyperboloid profile, on the cleaved end of a polarization-maintaining fiber.

2. A method of putting a lens on an optical fiber, the method comprising the steps of depositing a lens of elliptical section and in the form of a hyperboloid profile, on the cleaved end of a polarization-maintaining fiber, wherein the steps of depositing the lens of elliptical section and in the form of a hyperboloid profile consists in:

cleaving a polarization-maintaining optical fiber;

stretching a piece of another fiber axially to rupture, while applying heat thereto;

aligning the stretched piece of fiber on the cleaved end of the polarization-maintaining optical fiber and mechanically putting the tip of the stretched piece of fiber into contact with the core of the cleaved end of the polarization-maintaining optical fiber; and welding a portion of the tip of the stretched piece of fiber onto the core of the cleaved end of the polarization-maintaining optical fiber to form a lens of desired curvature.

3. A method of putting a lens on an optical fiber, the method comprising the steps of depositing a lens of elliptical section and in the form of a hyperboloid profile, on a cleaved end of a polarization-maintaining fiber, and including a further step which consists in fixing the piece of polarization-maintaining optical fiber fitted in this way with a lens, on a piece of optical fiber of a different kind.

4. A method according to claim 3, wherein the piece of optical fiber of a different kind is a piece of monomode fiber.

5. A method according to claim 3, wherein the piece of optical fiber of a different kind is a piece of graded index multimode fiber.

6. A method according to claim 3, wherein the piece of optical fiber of a different kind is a piece of step index multimode fiber.

7. A method according to claim 2, wherein the piece of stretched fiber is a piece of graded index multimode fiber.

8. A method according to claim 2, wherein the said welding step consists in:

rapid and low intensity fusion of the tip of the piece of stretched fiber, accompanied by withdrawal thereof as soon as welding appears on the core of the polarization-maintaining fiber; then fusion of a needle of glass by means of at least one pass under low intensity heating to obtain the curvature desired for the lens.

9. An optical system comprising a lens in the form of a hyperboloid profile and of elliptical section, deposited on a cleaved surface of a polarization-maintaining fiber.

10. An optical system comprising a lens in a form of a hyperboloid profile and of elliptical section, deposited on a cleaved surface of a polarization-maintaining fiber, wherein the piece of polarization-maintaining optical fiber fitted with a lens is fixed on a piece of optical fiber of a different kind.

11. A system according to claim 10, wherein the piece of optical fiber of a different kind is a piece of monomode fiber.

12. A system according to claim 10, wherein the piece of optical fiber of a different kind is a piece of graded index multimode fiber.

13. A system according to claim 10, wherein the piece of optical fiber of a different kind is a piece of step index multimode fiber.

14. An optical system comprising, between a main monomode optical fiber and a phototransducer, an assembly made up successively of a piece of graded index multimode fiber, a piece of polarization-maintaining fiber, and a microlens in the form of a hyperboloid profile and of elliptical section, deposited on a cleaved surface of said polarization-maintaining fiber.

15. An optical system comprising a microlens in the form of a hyperboloid profile and of elliptical section, deposited on a cleaved surface of a polarization-maintenance fiber, wherein the microlens is constituted by a multiple lens having increasing radius of curvature with increasing distance away from the phototransducer.

16. A system according to claim 14, wherein the various elements interposed between the phototransducer and the monomode fiber are fixed by splicing.

17. A system according to claim 12, wherein the piece of graded index multimode fiber is designed to adapt the beam to the mode specific to the monomode optical fiber.

18. A system according to claim 13, wherein the piece of step index multimode fiber is designed to adapt the diameter of the light beam to the working diameter of the piece of graded index multimode fiber.

19. A system according to claim 12, wherein the length of the piece of graded index multimode optical fiber is of the order of $[n+1] \times pitch \div 2$, where $[n=9, 1, 2, \ldots]$.

* * * * *

UNITED STATES PATENT AND TRADEMARK OFFICE
CERTIFICATE OF CORRECTION

PATENT NO. : 5,638,471
DATED : June 10, 1997
INVENTOR(S) : Semo et al.

It is certified that error appears in the above-identified patent and that said Letters Patent is hereby corrected as shown below:

In column 1 at line 8, please delete " filed " and insert -- field --.

In column 3 at line 35, please start a new paragraph with the phrase " As shown ".

In column 4 at line 15, please delete " 86 " and insert -- 36 --.

In column 8, claim 19 at line 65, please delete " n=9 " and insert -- n=0 --.

Signed and Sealed this

Thirty-first Day of March, 1998

Attest:

BRUCE LEHMAN

Attesting Officer

Commissioner of Patents and Trademarks